United States Patent [19]
Alley, Jr.

[11] Patent Number: 4,567,621
[45] Date of Patent: Feb. 4, 1986

[54] COMPOSITE WINDSHIELD WIPER ASSEMBLY

[76] Inventor: Robert L. Alley, Jr., 1314 Lincoln St. #201, Columbia, S.C. 29201

[21] Appl. No.: 587,624

[22] Filed: Mar. 8, 1984

[51] Int. Cl.⁴ .............................................. B60S 1/38
[52] U.S. Cl. ............................. 15/250.41; 15/250.03
[58] Field of Search ......................... 15/250.03, 250.04, 250.36–250.42

[56] References Cited

U.S. PATENT DOCUMENTS 2,918,689  12/1959  Pruett ............................. 15/250.04
3,224,027  12/1965  Oishei et al. ..................... 15/250.41

FOREIGN PATENT DOCUMENTS 1048932  11/1966  United Kingdom ............. 15/250.41
1316781  5/1973  United Kingdom ............. 15/250.41

Primary Examiner—Peter Feldman
Attorney, Agent, or Firm—Julian W. Dority

[57] ABSTRACT

A wiper blade assembly (A) for wiping and cleaning an automobile windshield includes a pair of spaced wiper blade elements (42, 44) having thin resilient wiping edges (42a, 44a). A scrubbing block (50) occupies the entire space between the wiping blade elements and includes a protrusion (52) of the scrubbing block which extends past the wiping edges (42a, 44a) a length, ΔX, to absorb a fraction of the normal force against the windshield and provide a light scrubbing action against the windshield. The mass of the scrubbing block is concentrated between the wiping edges (42a, 44a) to provide rigidity. The scrubbing material accumulates liquid for providing a reservoir which flushes out dirt during to and fro motion of the wiping action.

15 Claims, 6 Drawing Figures

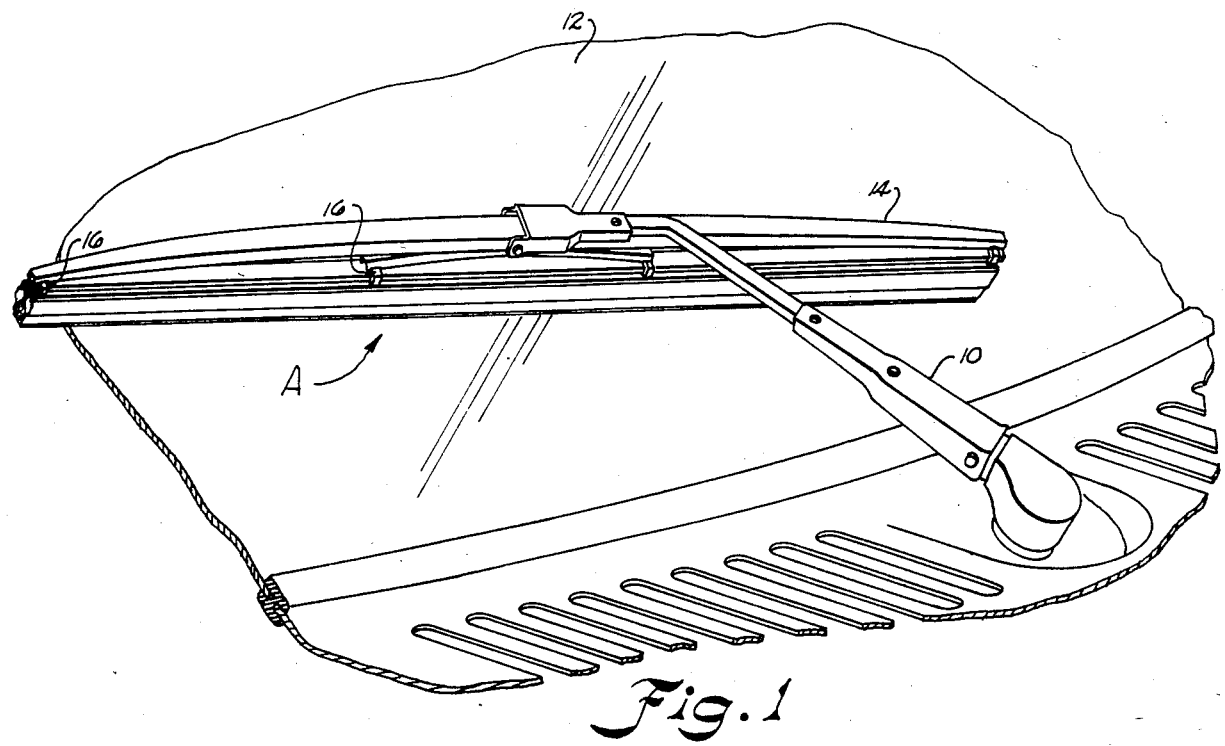
Fig. 1
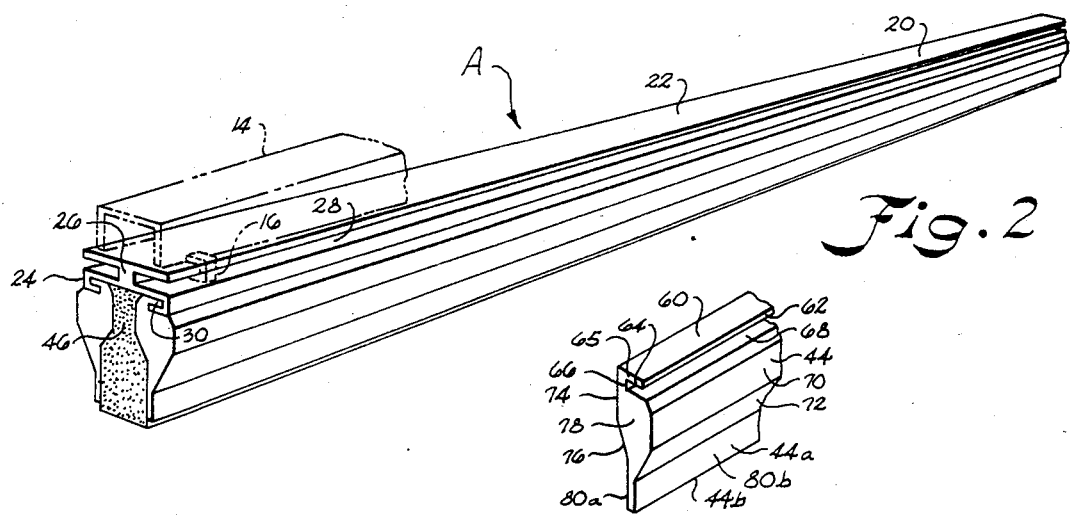
Fig. 2
Fig. 6
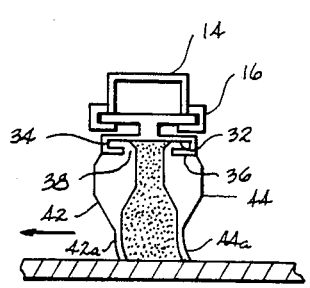
Fig. 3
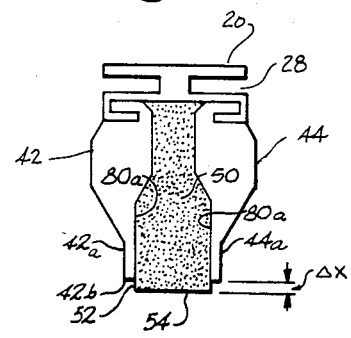
Fig. 5
Fig. 4

COMPOSITE WINDSHIELD WIPER ASSEMBLY

BACKGROUND OF THE INVENTION

The invention relates to a windshield wiper assembly for use in wiping an automobile type windshield. The windshield wiper assembly is the type formerly carried by the oscillating wiper arm of the automobile which moves the blade assembly generally in an arcuate path across the windshield.

The typical automobile windshield wiper assembly is sufficient for wiping water and water soluble material from the windshield but is not effective for wiping materials from the windshield which are not water soluble such as bugs, secretions from trees, road dirt, tars, and grease and oils from automobiles.

Heretofore, attempts have been made to provide a windshield wiper blade assembly for cleaning non-water soluble materials from the windshield as well as wiping water from the windshield. Such devices are shown in U.S. Pat. Nos. 4,327,457, 3,183,816, and 1,683,053. While the above attempt to provide wiping and cleaning by means of a scrubbing material between or on one side of a wiping blade, they are not entirely suitable, one reason being there is a considerable gap in the wiping blade assembly where dirt and grime can accumulate. The accumulated dirt and grime often venture down onto the windshield and cause a smear to occur.

In British Pat. No. 1,316,781 a cleaning and wiping windshield blade is disclosed having a pair of wiping elements and a scraping pad fixed between the wiping elements. However, the wiping elements are fairly rigid and do not afford sufficient flexibility in order for the wiping elements to deform and the scraping pad have sufficient force against the windshield to effectively clean the same.

Accordingly, an important object of the present invention is to provide a windshield wiper blade assembly for wiping water from a windshield and cleaning non-water soluble materials from an automobile windshield.

Still another important object of the present invention is to provide a windshield wiper blade assembly for wiping and cleaning an automobile windshield which minimizes the smear of non-water soluble materials across the windshield.

Still another important object of the present invention is to provide a windshield wiper assembly which includes a pair of highly flexible wiping edges and a block of porous scrubbing material bonded between the wiping edges which is more compressible than the wiping edges such that the flexing of the wiping elements and cleaning by the scrubbing material is done concurrently and effectively.

Still another important object of the present invention is to provide a wiping blade assembly having a pair of wiping blade elements spaced apart and between which is affixed a block of scrubbing material which protrudes past the wiping edges of the blade elements to absorb a part of the force normal to the windshield and which under compression maintains contact with the windshield and provides good dimensional stability.

SUMMARY OF THE INVENTION

The above objectives are accomplished according to the present invention by providing a windshield wiper blade assembly for wiping and cleaning the windshield of an automobile which includes an elongated spine member adapted for connection to the oscillating windshield wiping arm of the vehicle which includes a pair of spaced windshield wiper blade elements which are carried in a spaced apart relationship. The blade elements terminate in windshield wiper edges which are highly resilient. A scrubbing material space is defined between the windshield wiper blade elements and a block of scrubbing material is carried between the wiper blade elements substantially filling the scrubbing material space to eliminate any gaps where dirt and grime may accumulate. The block of scrubbing material includes an uncompressed protrusion which extends past ends of the resilient wiper blade edges and terminates in an abrasive windshield contacting surface. The extent of the protrusion of scrubbing material is a function of the load which is to be supported by the block of scrubbing material and is calculatable according to the invention as a function of the dimensions and compressibility of the block of scrubbing material, the normal force imparted to the windshield, and the percent of the force to be absorbed by the block of scrubbing material.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 1 is a perspective view illustrating a windshield wiper blade assembly constructed according to the present invention connected to an oscillating windshield wiper arm of an automobile;

FIG. 2 is a perspective view illustrating a windshield wiper blade assembly constructed according to the present invention;

FIG. 3 is an end elevation illustrating a windshield wiper blade assembly constructed according to the present invention going from right to left across a windshield surface;

FIG. 4 is an end elevation illustrating a windshield wiper blade assembly constructed according to the present invention going from left to right across a windshield according to the present invention;

FIG. 5 is an end elevation of a windshield wiper blade assembly constructed according to the invention having a protrusion of scrubbing material extending past the wiping blade elements according to the invention; and FIG. 6 is a partial perspective view illustrating a wiping blade element of a windshield wiping blade assembly constructed according to the invention.

DESCRIPTION OF A PREFERRED EMBODIMENT

Referring now to the drawings, a windshield wiper blade assembly is illustrated designated generally as A. The wiper blade assembly may be carried on an oscillating wiper arm 10 of an automobile for cleaning and wiping the windshield 12 of the automobile. The wiper arm 10 includes a carrier arm 14 having a plurality of slotted carrier clamps 16 which carry and hold the wiper blade assembly A in a conventional manner.

Referring now in more detail to the invention, in FIG. 1 the wiper blade assembly A is illustrated as including an elongated spine member 20 having a back flange 22 and a front flange 24. A web 26 connects the front and back flanges and defines a groove 28 on either side of the web 26 which receives the slotted carrier clamp 16. By this means, the blade assembly is carried on the wiper arm.

The front flange 24 includes a C-shaped channel 30. The C-shaped channel includes a back wall 32, a pair of side walls 34, and a pair of opposing inwardly extending flanges 36 which terminate short of each other to define a gap 38. The inwardly extending flanges 36, side walls 34, and back wall 32 define a pair of end connector channels 40 for holding a pair of wiping blade elements 42 and 44.

The first rubber-like blade element 42 depends downwardly from the C-shaped channel of the front flange 24 terminating in a first thin resilient wiping edge 42a. The second elongated rubber-like blade element 44 depends downwardly from an opposing side of the C-shaped channel 30 of the front flange 24 terminating in a second thin resilient wiping edge 44a. A space 46 is defined between the blade elements 42 and 44 and the back wall 32 of the C-shaped channel 30.

A block 50 of scrubbing material is carried in the space 46 between the elongated wiper blade elements 42 and 44 to completely fill the space and eliminate any gaps or void spaces and the accumulation of dirt and the like therein. Protrusion 52 of uncompressed scrubbing material, having a dimension $\Delta X$, extends past the ends 42b and 44b of the wiping blade elements 42 and 44. The protrusion 52 terminates in an abrasive windshield contacting surface 54 which is constructed of a material which has sufficient abrasiveness to remove non-water soluble materials such as bugs, tree sap, oils, tar, etc.

A suitable abrasive material is made by The 3-M Company of Minneapolis, Minn. under the name Industrial Scotch Brite. The material is color coded and the white material is essentially grit-free and will not scratch the windshield glass. A suitable material for the windshield wiping elements 40 and 42 is a rubber material such as B. F. Goodrich Compound No. 83741.

The scrubbing material has a porous interconnected pore structure that completely fills the space between the wiper blade elements. No dirt or foreign matter can accumulate in the wiper blade assembly which can be forced out by liquid onto the windshield. The porous material provides a reservoir of liquid that enhances the cleaning action of the abrasive contact surface 54.

The extent, $\Delta X$ of the uncompressed protrusion of the scrubbing block is a function of the part of the force which the block is to absorb. The inventions and compressibility of the block being known as will be more fully hereinafter set forth.

Referring to FIG. 6, it can be seen that the blade elements each include a first horizontal surface 60, a first vertical surface 62, and a third horizontal surface 64 which define a lip 65 which fits in an end channel 40 of the C-channel of the front flange 24 of the windshield wiper blade assembly. A second vertical surface 66 extends downwardly from the horizontal surface 64 and a third horizontal surface 68 extends outwardly from vertical surface 66. An exterior wall surface 70 extends from adjacent the horizontal surface 68 and includes an inclined portion 72 which terminates at the resilient wiping edge 44a. An interior wall surface extends from adjacent the vertical surface 60 and includes an inclined portion 76 which terminates at the wiping blade element 44a to thereby define and narrow the wiping edge to provide a thin resilient wiping edge 44a. The wiping blade element so constructed includes an upper bulbous portion 78 and narrowed and thin wiping blade edge 44a. The mass of the wiping blade element is concentrated in the upper bulbous portion so that the lower wiping edge is highly resilient. Blade 42 is identically constructed.

The wiping blade element 44a includes two parallel wall surfaces 80a and 80b. As can best be seen from FIG. 5, the thickened bulbous portions of the wiper blades define a bottleneck space in the thinner wiping blade edges create a widened space. The scrubbing block has a bottle-shaped cross-section such that the mass of the block is concentrated between the thin wiping edges 42 and 44. The scrubbing block is bonded to the wiping edges to thus stiffen the highly resilient and thin wiping edges. The scrubbing material 50 is more compressible than the material of the wiping edges. Thus, the porous scrubbing material provides rigid support to the very thin outer walls of the wiping blade edges. The scrubbing block walls are parallel and contiguous with the interior walls 80a of the wiper blade elements and stay substantially parallel therewith during the wiping action as can best be seen in FIGS. 3 and 4.

OPERATION

A dirt flushing action is imparted at the onset of the left to right stroke of the wiper blade assembly wherein the right wiper blade element 44 closes a gap previously created because of its trailing motion on the right to left stroke thus flushing out any loose dirt or debris. A reservoir of water in the porous material of the scrubbing block is also flushed at the onset of the reverse stroke. Rain or wiper water keeps the porous reservoir filled with cleaning water.

The power required to drive the wiper arm with the wiper blade assembly A should not be more than 10% the power required to drive a conventional blade. Factors controlling power at low speed are coefficient of friction between the rubber and porous material and the windshield respectively, and the spring force (normal to the window surface) of the arm. The porous material is more compressible than the rubber material.

If FN is the normal force of the wiper blade assembly on the windshield (as determined by the spring loading of the wiper arm); B the porous material compressibility; W, L, and X the width, length and height of the porous block, respectively; and $\alpha$ is the fraction of the load to be carried by the porous scrubber then it has been found that $\Delta X$ the uncompressed protrusion, is given by the following:

$$\Delta X = (F_N X B)/WL$$

Since about one-half the load can be carried by the rubber, the thickness of the rubber blade in contact with the windshield can be one-quarter that of a conventional rubber blade. The remaining one-half of load is carried by the porous material. By adjusting the extent of protrusion of the porous material to carry a fraction, $\Delta$, of the load, the thickness of each of the rubber blades on either side of the porous material can be reduced to $(1-(\alpha/2))$ of the conventional rubber blade thickness and the same wear life can be retained.

This distribution of the load allows one to eliminate excess material and weight from the blade. If the coefficient of friction of the rubber and porous material are similar, the power to drive the blade is about equal to conventional blade power.

At high speed the power required to drive the blade is established by the viscous drag of the water film between the wiper and windshield. Because this film will thicken as the velocity of the blade increases, the porous material under compression will provide for maintenance of contact of the scrubber pad with the windshield. An important feature is the protrusion of the porous material beyond the edge of the rubber edge, with no gap between the rubber and porous material. This blade exhibits good dimensional stability which eliminates conventional blade edge buckles and twists out of line under load. The total mass of the wiper balde assembly is maintained nearly equal to that of a conventional wiper blade assembly.

It will be understood, of course, that while the form of the invention herein shown and described constitutes a preferred embodiment of the invention, it is not intended to illustrate all posible form of the invention. It will also be understood that the words used are words of description rather than of limitation and that various changes may be made without departing from the spirit and scope of the invention herein disclosed.

What is claimed is:

1. A windshield wiper blade assembly having an elongated composite scrubber wiper blade for wiping and cleaning the windshield of an automobile of the type which includes a spring loaded wiper arm for holding the wiper blade under force against the windshield and oscillating the blade back and forth across the windshield, said wiper blade assembly comprising:

an elongated spine member including a back flange, a front flange having a C-shaped channel flange formed therein facing the windshield during operation, and a web connecting the front and back flanges;

said C-shaped channel including a back wall, a pair of side walls depending downwardly from said back wall, and opposing side flanges extending inwardly towards each other from said side walls and terminating short of each other to form connector end channels and defining a gap in said front face of said C-shaped flange;

a first rubber-like blade element depending downwardly from said C-shaped channel of said front flange of said wiper blade assembly terminating in a first resilient wiping edge;

a second elongated rubber-like blade element depending downwardly from an opposing side of said C-shaped channel of said front flange terminating in a second resilient wiping edge, said first and second wiping edges being capable of carrying a substantial portion of the load resulting from the force exerted by the wiper arm;

a space defined between said first and second rubber-like blade elements and said back wall of said channel flange;

a connecting portion formed in each said rubber-like elongated blade element received in said end channel of said C-shaped channel of said front flange;

a block of scrubbing material carried in said space between said first and second elongated wiper blades filling said space entirely between said blades to eliminate any void spaces and avoid accumulation of dirt and the like; and a protrusion of said scrubbing material extending past ends of said resilient wiper edges having an abrasive surface contacting said windshield, said protrusion having a sufficient extent so that said abrasive scrubbing surface contacts said windshield generally concurrently with said wiping edges of said elongated wiper elements and likewise is capable of carrying a substantial portion of the force exerted by the wiper arm whereby cleaning and wiping are facilitated generally concurrently.

2. The assembly of claim 1 wherein each said blade element includes:

a first horizontal surface, a first vertical surface, and a second horizontal surface defining a connector lip which fits in said end channel of said C-channel of said front flange;

an interior wall surface extending from said connector lip to said thin wiping edge of said blade element, a portion of said interior wall being inclined to said wiping edge to narrow said wiping edge;

a second vertical surface depending downwardly from said second horizontal surface, a third horizontal surface extending outwardly from said second vertical surface past defining a slot in which said opposing side flanges fit;

an exterior wall surface extending from adjacent said third horizontal surface to said wiping edges including an inwardly inclined portion to form said thin wiping edge narrowed with respect to the remainder of said blade element.

3. The assembly of claim 1 or 2 wherein said resilient wiping edges of said blade elements include a vertical interior wall surface and a vertical exterior wall surface parallel to said interior wall surface, said wiping edges carrying approximately half the force exerted by said wiper arm and the scrubbing material carrying the other half.

4. The assembly of claim 3 wherein said block of scrubbing material includes parallel wall surfaces which are bonded with said interior wall surfaces of said wiping edges and are generally parallel with one another, said wall surfaces of said wiping edges and said block of scrubbing material remaining generally parallel with one another during wiping.

5. The assembly of claim 1 wherein said wiper blade elements include a thickened top portion which forms said connector portion received in said connecting end channels of said C-shaped channel, and said elongated resilient wiper blades terminating in a thin blade portion which defines said resilient wiping edges.

6. The assembly of claim 5 wherein said space between said first and second elongated blade elements include an upper reduced neck portion between said thickened portions of said wiper blade elements and a widened body space between said thin wiping edges of said blade elements, and said scrubbing material including an elongated block having a generally bottle-shaped cross-section which substantially fills said space between said first and second blade elements extending through said gap in said C-channel of said front flange.

7. The assembly of claim 1 wherein said scrubbing material is porous and has an abrasive surface which will not scratch glass.

8. A windshield wiper blade assembly for wiping and cleaning the windshield of an automobile and the like having oscillating spring loaded windshield wiper arms, said assembly comprising:

an elongated spine member adapted for connection to said windshield wiper arm;

a pair of spaced windshield wiper elements carried by said back spine member terminating in windshield wiper edges which are generally resilient edges which terminate in substantially flat end surfaces that contact the windshield;

a scrubbing material space defined by said windshield wiper blade elements being spaced from one another;

a block of elongated scrubbing material carried in said space between said first and second elongated blade elements substantially filling said entire space to eliminate any void spaces where dirt and grime may accumulate and smear said windshield;

said block of scrubbing material including an uncompressed protrusion extending past ends of said resilient wiper blade edges terminating in an abrasive windshield contacting surface which is substantially flat; and said protrusion having an extend which is a function of the load supported by said block of scrubbing material and when under compression the windshield contacting surfaces of the wiper elements and the scrubbing material concurrently contact the windshield.

9. The assembly of claim 8 wherein the extent of said protrusion, $\Delta X$, extending past the ends of said wiping edges is defined by $$\Delta X = \alpha F_N X B / W L$$

where, $\alpha$ = the percent of the load to be borne by the block of scrubbing material
$F$ = the normal force on the windshield
$X$ = the height of the scrubbing block
$L$ = the length of the scrubbing block
$W$ = the width of the scrubbing block
$B$ = the compressibility of the scrubbing block.

10. The apparatus of claim 8 wherein said windshield wiper elements include:

a bulbous upper portion which is thickened relative to said resilient wiper edges for resistance and stiffening of said wiper blade elements to resist said wiping action; and said elongated block of scrubbing material including a widened windshield contacting portion which is widened relative to an upper reduced neck of said block material which is received between said thickened portions of said wiper blade elements whereby the mass of said scrubbing material is concentrated at said windshield contacting surface and the mass of the blade elements are minimized at said wiping edges.

11. The apparatus of claim 10 wherein said block of scrubbing material extends beyond said resilient wiper edges of said blade elements such that approximately fifty to seventy-five percent of the force normal to the windshield is supported by said block of scrubbing material.

12. The assembly of claim 11 wherein said scrubbing material is an interconnected open porous structure coated with a soft non-scratching abrasive at said windshield contacting surface.

13. A windshield wiper assembly for wiping and cleaning the windshield of an automobile and the like of the type which includes spring loaded windshield wiper arms oscillating back and forth across the windshield in a wiping action, said assembly comprising:

an elongated spine member;

a pair of elongated blade elements carried by said spine member in a spaced-apart relationship defining an open space therebetween;

an elongated block of porous scrubbing material carried between said wiper blade elements generally filling said space between said wiper blade elements to eliminate the accumulation of dirt, oil, and the like which can cause smearing of the windshield, said scrubbing material protruding beyond the wiper elements when uncompressed; and said block of porous material being carried between said first and second blade elements to concurrently support a part of the force which is normal to the windshield when the porous material is compressed under said force.

14. The assembly of claim 13 wherein each said blade element includes:

an upper bulbous connector portion connected to said spine member which is thickened relative to the remainder of said blade element;

a lower thin wiping edge substantially reduced in thickness relative to said upper bulbous portion so that said wiping edge is highly resilient and the mass of said blade element is concentrated in said upper bulbous portion;

said block of said scrubbing material being bonded to said thin wiping edges and having an upper portion reduced in width relative to a lower portion so that the mass of said block is concentrated between said thin wiping edges rigidly supporting the thin wiping edges of said blade assembly.

15. The assembly of claim 14 wherein said block of scrubbing material includes a protrusion extending past the ends of said wiping edges when uncompressed, said scrubbing material being more compressible than said wiping edges and compressing to maintain said abrasive scrubbing surface in contact with said windshield.

* * * * *